United States Patent [19]
Butler

[11] Patent Number: 5,519,991
[45] Date of Patent: May 28, 1996

[54] INCREASED EFFICIENCY ARCJET THRUSTER

[75] Inventor: George W. Butler, Seattle, Wash.

[73] Assignee: Olin Corporation, Redmond, Wash.

[21] Appl. No.: 298,010

[22] Filed: Aug. 30, 1994

[51] Int. Cl.$^6$ ................................................. F02K 11/00
[52] U.S. Cl. ..................... 60/203.1; 313/46; 60/266
[58] Field of Search ........................ 60/200.1, 203.1, 60/266; 219/121.11, 121.48, 121.5; 313/11, 30, 33, 35, 36, 38, 39, 46, 356, 634

[56] References Cited

U.S. PATENT DOCUMENTS

| | | | |
|---|---|---|---|
| 3,304,719 | 2/1967 | Ducati | 60/203.1 |
| 3,308,623 | 3/1967 | Ferrie et al. | 60/203.1 |
| 3,309,873 | 3/1967 | Cann | 60/203.1 |
| 4,322,946 | 4/1982 | Murch et al. | 60/203.1 |
| 4,523,429 | 6/1985 | Bingley | 60/203.1 |
| 4,548,033 | 10/1985 | Cann | 60/203.1 |
| 4,800,716 | 1/1989 | Smith et al. | 60/203.1 |
| 4,805,400 | 2/1989 | Knowles | 60/203.1 |
| 4,866,929 | 9/1989 | Knowles et al. | 60/203.1 |
| 4,882,465 | 11/1989 | Smith et al. | 219/121.48 |
| 4,907,407 | 3/1990 | Simon et al. | 60/203.1 |
| 4,926,632 | 5/1990 | Smith et al. | 60/203.1 |
| 4,967,637 | 11/1990 | Loffler et al. | 60/203.1 |
| 4,995,231 | 2/1991 | Smith et al. | 60/203.1 |
| 5,076,051 | 12/1991 | Naff | 60/203.1 |
| 5,111,656 | 5/1992 | Simon et al. | 60/203.1 |
| 5,319,926 | 6/1994 | Steenborg | 60/203.1 |

OTHER PUBLICATIONS

Wallner, et al., "Arcjet Thruster for Space Propulsion", NASA Tech Note D-2868, Jun. 1965 at pp. 1-69.
Esker, "Comparison of Arcjet Exhaust Velocity with the Propogation Velocity of Random Light Fluctuations", J. Spacecraft, May 1967, pp. 685-687.
Jahn, "Physics of electric Propulsion" Chapter 6, Electrothermal Acceleration published by McGraw-Hill Book Company, 1968, pp. 91-131.
Hoskins, et al., "A Comparison of Regenerative and Conventional Arcjet Performance", published by the American Institute of Aeronautics and astronautics, 1994, pp. 1-11.

Primary Examiner—Richard A. Bertsch
Assistant Examiner—Ted Kim
Attorney, Agent, or Firm—Gregory S. Rosenblatt

[57] ABSTRACT

There is disclosed an anode for an electrothermal arcjet thruster. The anode includes a divergent nozzle having, in tandem, a recombination portion and an expansion portion. The expansion portion has a greater rate of divergence than the recombination portion. A regeneration channel containing flowing propellent gas extends internally within the anode adjacent the recombination portion. The combination of the biangle nozzle and the regeneration channel produces an arcjet thruster having a markedly increased thrust efficiency.

17 Claims, 5 Drawing Sheets

INCREASED EFFICIENCY ARCJET THRUSTER

BACKGROUND OF THE INVENTION

1. Field of the Invention

This invention relates to small propulsion systems for maneuvering spacecraft and, more particularly, to an electrothermal arcjet thruster having an anode with a biangle expansion portion and contoured internal regeneration channels to more efficiently convert thermal energy of a flowing propellant to kinetic energy.

2. Description of the Prior Art

An electrothermal arcjet thruster converts electrical energy to thermal energy by heat transfer from an arc discharge to a flowing propellant. The thermal energy is converted to directed kinetic energy by expansion of the heated propellant through a nozzle.

Most electrothermal arcjet thrusters have as common features an anode in the form of a nozzle body and a cathode in the form of a cylindrical rod with a conical tip. The nozzle body has an arc chamber defined by a constrictor in a rearward portion of the body and a nozzle in a forward portion thereof. The cathode rod is aligned on the longitudinal axis of the nozzle body with its conical tip extending into the upstream end of the arc chamber in spaced relation to the constrictor so as to define a gap therebetween.

When a sufficiently high current is applied, an electric arc is initiated between the cathode rod and the anode nozzle body at the entrance to the constrictor. The arc is then forced downstream through the constrictor by pressurized vortex-like flow of a propellant gas introduced into the arc chamber about the cathode rod. The arc stabilizes and attaches at the nozzle. The propellant gas is heated in the regions of the constrictor and of arc diffusion at the mouth of the nozzle downstream from the constrictor. The super-heated gas is exhausted out from the nozzle to achieve thrust.

Historically, propellants, such as ammonia or hydrogen, have been used in electrothermal arcjet thrusters. More recently, hydrazine ($N_2H_4$) has been used. Propellants such as ammonia and hydrazine are preferred because these propellants are storable as a liquid without refrigeration while cryogenic propellants such as hydrogen and helium are not. The liquid storable fuels are converted to a gaseous propellent by passing the fuel through a gas generator.

The specific impulse ($I_{sp}$) determines the propellant mass required to complete a flight. $I_{sp}$ is denoted in pounds of force-second per pound of mass. The generation of a high $I_{sp}$ in an arcjet thruster requires operation of the thruster at a high specific energy (as denoted in watts/kg). The cryogenic propellants have a typical $I_{sp}$ value of up to 1,500 lbf-sec/lbm. The liquid storable propellants have a much lower specific impulse, on the order of 800–1000 lbf-sec/1 bm.

One way to increase $I_{sp}$ is to increase the thrust efficiency of the arcjet thruster. U.S. Pat. No. 5,111,656 to Simon et al, discloses increasing the specific impulse of a propellant by a unique nozzle configuration. The exhaust portion of the nozzle has a divergent recombination portion in tandem with a divergent expansion portion. The divergence of the recombination portion is less than that of the expansion portion, causing a temporary delay in the pressure reduction of the propellant gas. This delay creates a relatively high pressure region in the recombination portion of the nozzle permitting a partial recombination of the ionized and neutral species of the propellant gas and a partial recovery of frozen flow losses back into the gas.

Frozen flow losses reduce the efficiency of an arcjet thruster. Frozen flow losses include ionization, disassociation and deposition of energy into excited molecular and atomic states. These losses occur when the propellant gas is heated to very high temperatures by close contact with the electric arc and is then exhausted out the nozzle. If the propellant dwells for insufficient time in high pressure regions, the gas does not have time to recombine the ions or disassociated molecules or to relax the excited states. Energy locked into these processes is lost and unavailable for thrust.

U.S. Pat. No. 5,111,656 is incorporated by reference in its entirety herein. The biangle nozzle disclosed in that patent increases the efficiency of the electrothermal arcjet thruster at low power levels by reducing frozen flow losses. However, the nozzle also generates more heat at the anode surface and, as the energy level (power/mass flow rate) of the thruster increases, the advantage over a single angle nozzle decreases. At relatively high specific energy levels, the efficiency of a biangle nozzle is inferior to that of a single angle nozzle.

The biangle nozzle converts more chemical energy to thermal energy than a single angle nozzle. When operating at high specific energy, most of this extra energy in the form of heat is lost by conduction into the anode or exhausted out the nozzle and does not assist in improving the efficiency of the electrothermal arcjet thruster.

It is known to preheat a propellant gas by flowing the gas through regeneration channels in the anode body prior to exposure to the electric arc. The anode body is heated by the plasma arc and by the disassociating propellant gas. A portion of this heat is recaptured by the propellant gas flowing through the regeneration channels. Preheating the propellant gas forms a more reactive form of propellant gas as disclosed in both U.S. Pat. Nos. 4,548,033 to Cann and 4,995,231 to Smith et al, both of which are incorporated by reference in their entireties herein.

The regeneration channels may assist in cooling the anode, reducing thermal stress on the thruster materials and extending thruster life. However, since the propellant gas has a lower coefficient thermal conductivity than the anode body, the regeneration chambers may also constitute a thermal insulator.

There exists, therefore, a need for a biangle nozzle for an electrothermal arcjet thruster that provides increased thrust efficiency at relatively high specific power levels.

SUMMARY OF THE INVENTION

Accordingly, it is an object of the invention to provide an anode nozzle design for an arcjet thruster that has increased thrust efficiency. It is a feature of the invention that the anode nozzle comprises the combination of a biangle divergent portion with a regeneration system incorporated into the anode wall and matched to the biangle contour.

Among the advantages of the arcjet anode of the invention are that the thrust efficiency and specific impulse is increased at relatively high specific energy levels. Another advantage is that both frozen flow losses and thermal losses are reduced without a corresponding increase in gas ionization loss. Still another advantage is that the arcjet thruster operates at higher voltages and lower amperages, reducing erosion of the walls of the anode. A further advantage is that the anode temperature is reduced, further reducing erosion of the anode.

In accordance with the invention, there is provided an anode for an arcjet thruster. The anode has an electrically conductive body containing a regeneration channel. A converging upstream wall of the body has both an inlet and an outlet for the regeneration channel. A constrictor portion forms a centrally disposed wall of the electrically conductive body defining a cylindrical aperture. A first end of the constrictor portion is adjacent to the converging upstream wall portion. An opposing second end of the constrictor portion is adjacent a diverging nozzle portion. The diverging nozzle portion forms a downstream wall of the electrically conductive body. A diverging nozzle portion has, in tandem, a divergent recombination portion and a divergent expansion portion with the expansion portion having a greater rate of divergence than the recombination portion.

The above stated objects, features and advantages will become more apparent from the specification and drawings which follow.

DETAILED DESCRIPTION

Figure 1:
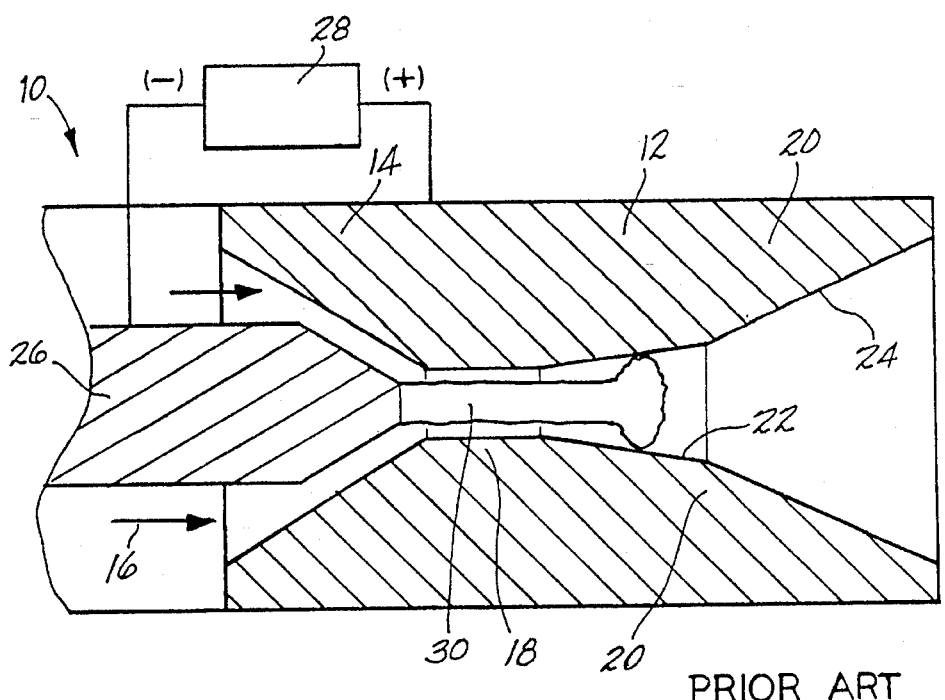
FIG. 1 shows in cross-sectional representation a biangle anode nozzle as known from the prior art.

FIG. 1 shows in cross-sectional representation an electrothermal arcjet thruster 10 as known from the prior art. The arcjet thruster 10 has an anode body 12 that is usually formed from an electrically conductive, heat resistant metal or metal alloy such as tungsten or a tungsten alloy. The anode body 12 may be arbitrarily divided into three portions. A converging upstream portion 14 forms one surface of the anode body 12 and directs a propellant 16, such as hydrazine, to a constricted portion 18. The constricted portion 18 is a cylindrical aperture having a first end adjacent the converging upstream portion and an opposing second end adjacent a diverging downstream portion 20. The diverging nozzle portion 20 has, in tandem, a divergent recombination portion 22 and a divergent expansion portion 24. The expansion portion 24 has a greater rate of divergence than the recombination portion 22.

A generally rod shaped cathode 26 is positioned within the upstream portion in close proximity, but spaced from, the constricted portion 18. A power supply 28 establishes a voltage potential between the anode 12 and cathode 26 generating an electric arc 30. The flowing propellant gas 16 pushes the electric arc 30 through the constricted portion 18 to the recombination portion 22 where the electric arc 30 attaches to a wall of the anode 12. Heated propellant gases are expelled from the expansion portion 24 to propel the space craft.

A portion of the propellant gas is disassociated to ions and neutral species without the generation of kinetic energy. The energy lost forming these disassociated species is referred to as "frozen flow losses". By providing a relatively high pressure area in the recombination portion 22 of the arcjet thruster 10, a percentage of these dissociated and ionized species is recombined and generates thermal energy, thereby increasing the thrust achieved by a biangle nozzle over a comparable single angle nozzle.

When the specific energy demand is increased, as manifest by a decrease in propellant 16 flow at constant power, the gain in thrust efficiency achieved by the biangle nozzle over a single angle nozzle decreases. As graphically illustrated in FIG. 2, at high specific energy levels the efficiency of a biangle nozzle is less than that of a single angle nozzle.

Figure 2:
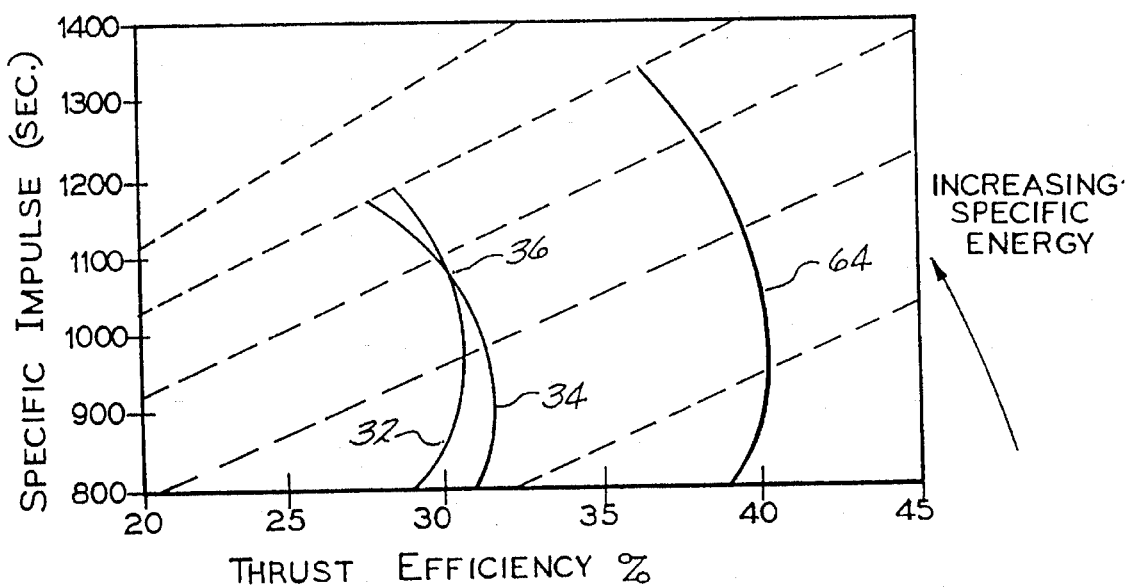
FIG. 2 graphically illustrates the relationship between specific impulse and thrust efficiency for different nozzle configurations at varying power levels.

With reference to FIG. 2, constant specific energy levels are denoted by the parallel running broken lines. The thrust efficiency (in percent) as a function of specific impulse (in seconds) for a conventional single angle nozzle is indicated by reference line 32. The same relationship for a biangle nozzle is denoted by reference line 34. At low specific energy levels, the efficiency of the biangle nozzle is greater than that of the single angle nozzle. However, above a threshold crossover specific energy level 36, which is different for each propellent and on the order of 35 MJ/kg for hydrazine, the efficiency of the biangle nozzle is worse than that of the single angle nozzle.

Figure 3:
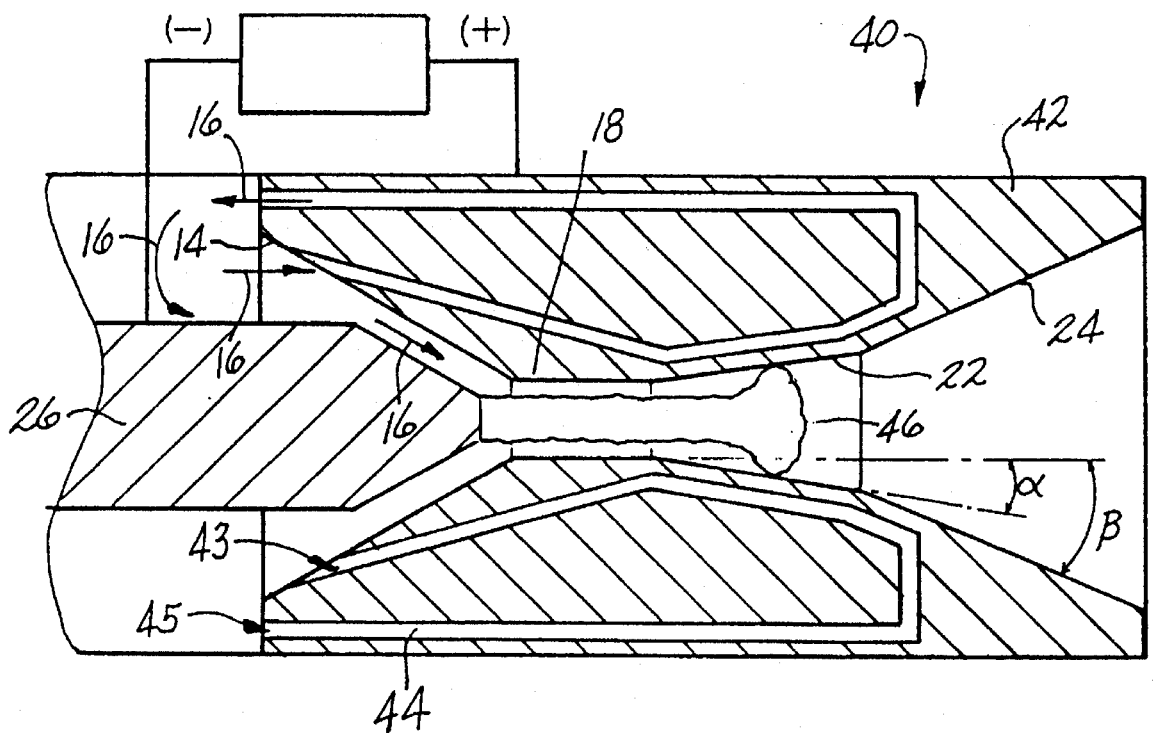
FIG. 3 illustrates in cross-sectional representation an anode nozzle in accordance with an embodiment of the invention.

FIG. 3 illustrates in cross-sectional representation an electrothermal arcjet thruster 40 that provides increased thrust efficiency at high specific energy requirements. The cathode 26 is formed from any suitable electrically conductive material such as a copper alloy. The anode body 42 is formed from an electrically conductive metal or metal alloy able to withstand relatively high temperatures, on the order of 2000° C., with minimal distortion. Preferred materials for the anode body include tungsten and tungsten based alloys such as tungsten/2% by weight thorium and 3.5%–4.5% by weight rhenium, 0.35 molar percent hafnium carbide and the balance tungsten.

The anode body 42 includes one or more regeneration channels 44. The regeneration channels 44 extend internally within the electrically conductive anode body 42 and occupy a portion of the cross-sectional area of the anode body 42.

The regeneration channel 44 communicates with the anode nozzle through a regeneration inlet 43 and a regeneration outlet 45. The regeneration inlet and outlet are apertures opening generally from the wall of the upstream converging portion 14. The inlet is positioned so that the propellent gas 16 passes behind the wall of the recombination portion 22 while relatively cool, before being excessively heated by passage through the anode body 42.

The preferred fuels are liquid storable propellant gases, such as hydrazine or ammonia. These gases have a lower coefficient of thermal conductivity than either tungsten or the tungsten alloy materials used in anode construction. If an excessive volume of the anode body is replaced with the regeneration channels 44, the heat generated by the plasma arc 46 and absorbed by the anode body 42 is inadequately dissipated. The anode body temperature increases until the anode body distorts, destroying the arcjet thruster.

Figure 4:
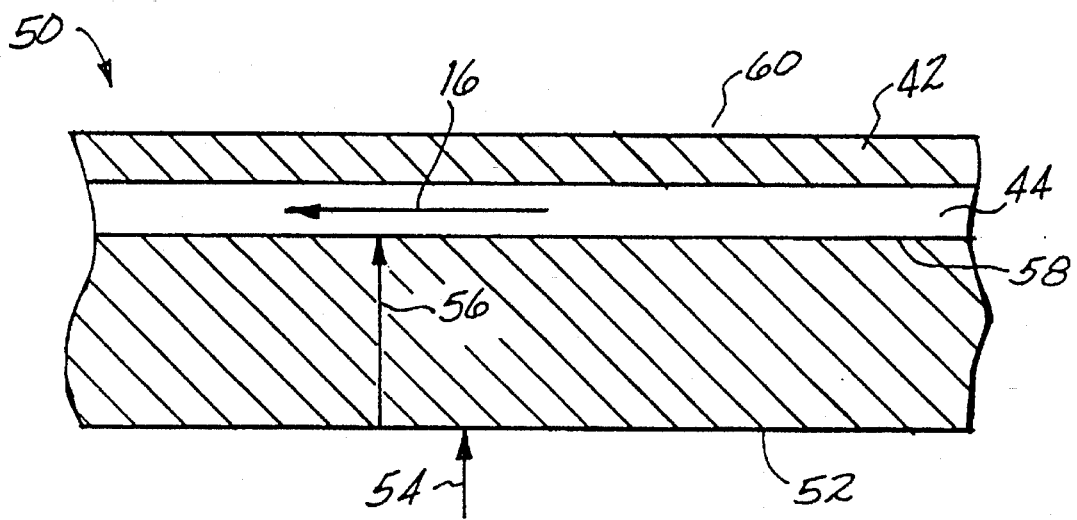
FIG. 4 shows in cross-sectional representation the flow of heat through a portion of the anode body.

FIG. 4 illustrates in cross-sectional representation a portion 50 of the anode body 42 including a regeneration channel 44. Energy, in the form of heat generated by the plasma arc, contacts an inner surface 52 of the anode body 42 as denoted by reference arrow 54. The heat is conducted through the wall of the anode body 42 to regeneration channel 44 as denoted by reference line 56. The propellant 16 flowing through the regeneration channel 44 absorbs an amount of energy necessary to raise the propellant temperature to approximately equal to the temperature of the inner wall 58 of the regeneration channel 44. Heat transferred to an outer surface 60 of the anode body 42 includes heat conducted from the inner wall surface 58 of the regeneration channel 44 and heat thermally conducted through the propellant gas 16. The heat reaching the outer wall 60 is radiated into space.

In order to lower the inner wall 52 temperature, the regeneration efficiency, the amount of heat absorbed by the propellant gas that is retained by the gas, rather than conducted to the anode wall 42 must be greater than about 65% and preferably in the range of from about 80% to about 97%.

To maximize the regeneration efficiency, a regeneration channel 44 is adjacent the wall of the recombination portion 22 and contoured to substantially match the angle of the recombination portion. Preferably, the contour also matches a portion of the expansion portion 24 as well. The position and contour of the regeneration channel 44 is best illustrated in FIG. 3. Preferably, the regeneration channel is as close to the surface of the recombination portion 22 as possible without weakening the wall strength to a point where thermal distortion occurs. Typically, the regeneration channel 44 is from about 1.25 mm to about 5.1 mm (0.05–0.20 inch) and preferably from about 1.9 mm to about 3.8 mm (0.075–0.15 inch) from the wall surface.

The angle, $\alpha$, between the recombination portion 22 and the constricted portion 18 is from about 1° and about 10°. Preferably the angle, $\alpha$, is from about 3° to about 7°. The angle, $\beta$, between the expansion portion 24 and the constricted portion 18 is from about 10° and about 40°. Preferably, the angle, $\beta$, is from about 15° to about 30°.

Referring back to FIG. 2, reference line 64 denotes the relationship between thrust efficiency and specific impulse for the nozzle 40 of FIG. 3. It may be seen in FIG. 2 that the thrust efficiency and specific impulse of the anode nozzle of the invention is superior to the prior art nozzles denoted by reference numerals 32 and 34 at all power levels.

Figure 5A:
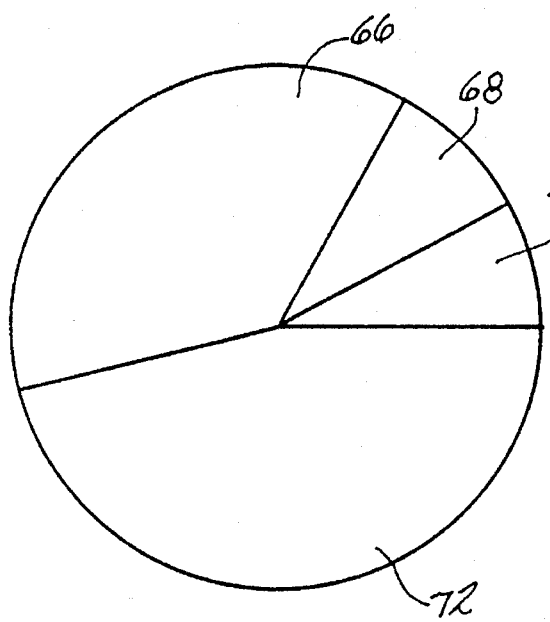
FIGS. 5A and 5B graphically illustrate the energy conversion in an electrothermal arcjet thruster.
Figure 5B:
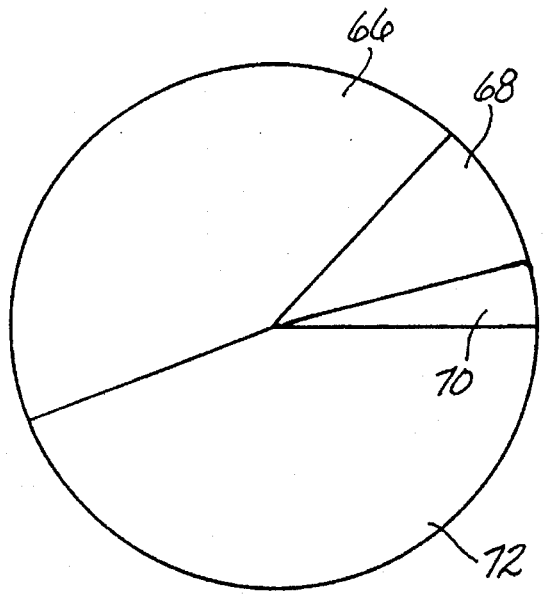

The source of improved thrust efficiency is illustrated in FIGS. 5A and 5B. FIG. 5A illustrates the energy distribution of a conventional (single angle, no regeneration) 10 kilowatt, 150 MJ/kg arcjet thruster. The efficiency, that portion constituting thrust and identified by reference numeral 66 is 34.3%. The losses are comprised of thermal losses 68, 8.6% constituting heat absorbed by the anode; ionization losses 70, 8.5%, constituting energy introduced into the propellant gas and forming non-reactive gaseous species; and "other" denoted by reference line 72, and constituting 48.6% of the loss. "Other" is a combination of frozen flow losses and wasted heat exhausted with the propellant gas out from the anode nozzle.

Referring to FIG. 5B, the energy distribution for the biangle regenerative anode of the invention operating at 10 KW, 150 MJ/kg has a thrust efficiency 66 of 39.6%. The thermal losses 68 through the anode are 5.0%. The ionization losses 70 are 9.1% and the "other" losses 72 are 46.3%.

Figure 6:
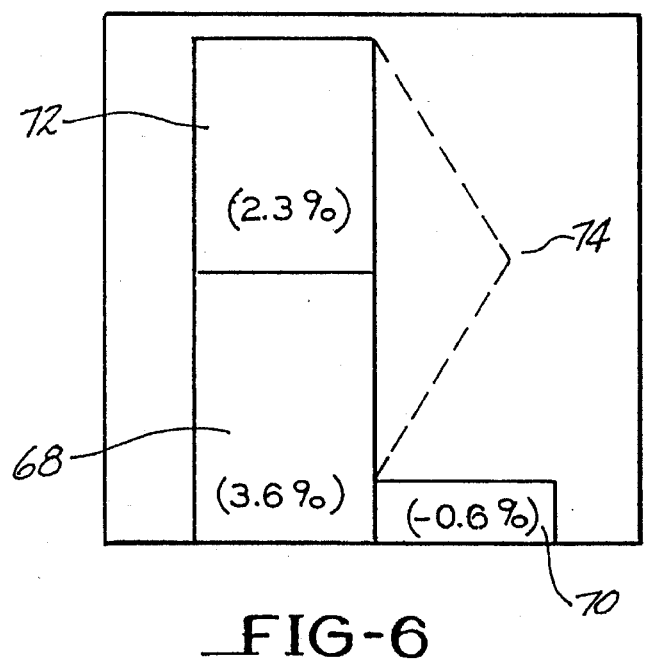
FIG. 6 illustrates in graphical form the improved efficiency achieved by the nozzle of the present invention.

FIG. 6 illustrates graphically where the 5.3% increase in thrust efficiency of the arcjet thruster of the invention is constituted. There is a 2.3% decrease in "other" losses 72, a 3.6% decrease in thermal losses 68 and a 0.6% increase in ionization losses constituting a net increase in thrust efficiency 74 of 5.3%.

FIG. 6 illustrates that the increased efficiency was not brought about merely by improved performance recovery of thermal losses. Rather, unexpectedly in view of FIG. 2, the frozen flow losses were also reduced by 2.3%.

Figure 7:
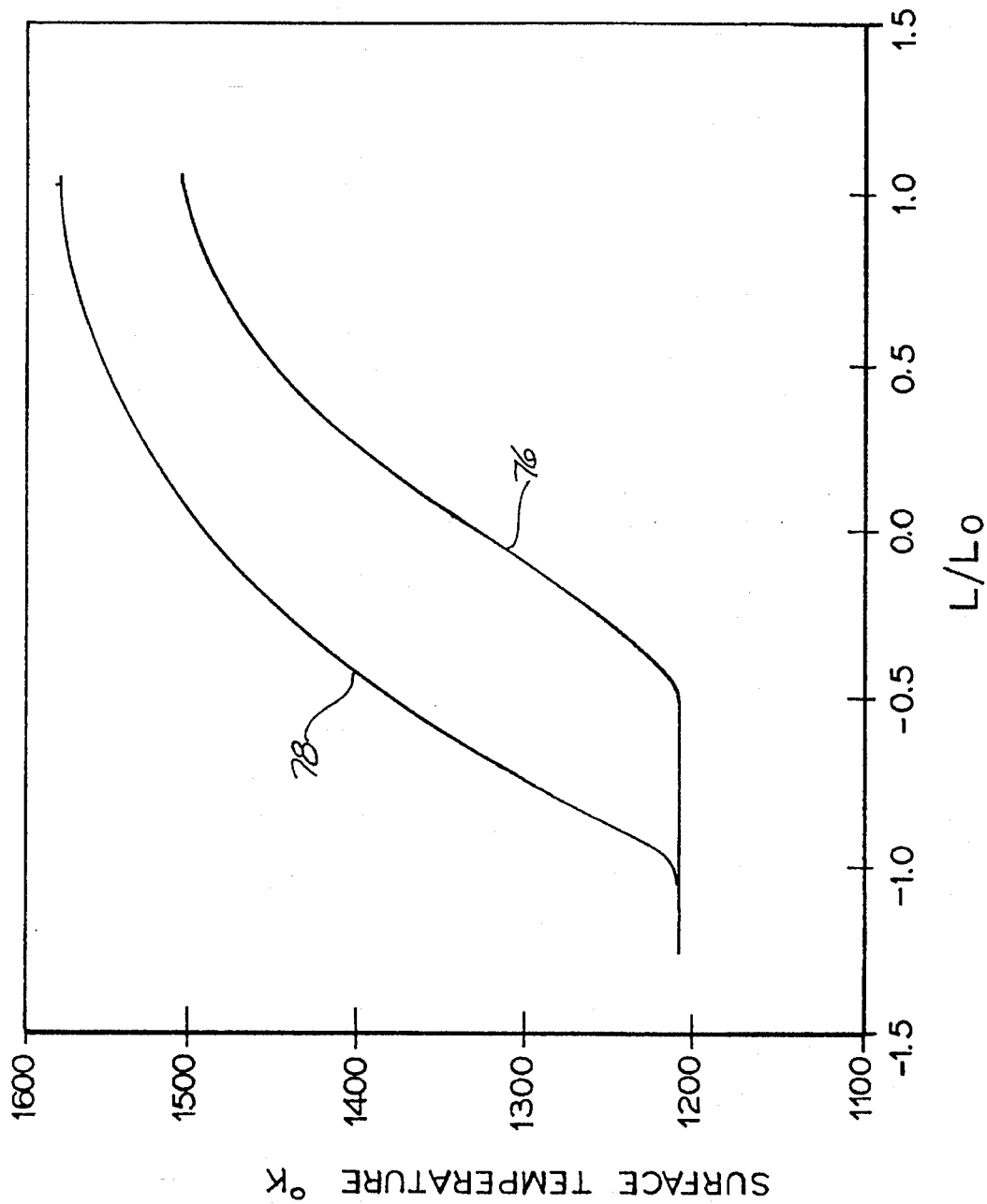
FIG. 7 graphically illustrates the operating temperature of an anode nozzle.

FIG. 7 graphically illustrates that by selecting the regeneration efficiency to be in excess of 65% as described above, it is possible to operate the biangle nozzle denoted by reference line 76 at a lower temperature than a conventional single angle nozzle denoted by reference line 78. The abscissa is expressed as a function of the normalized distance from the constrictor exit ($L/L_o$) such that at the constrictor exit $L/L_o$ equals zero. When the thermal efficiency is about 95%, as illustrated in FIG. 7, the temperature reduction is up to 200° K.

Figure 8:
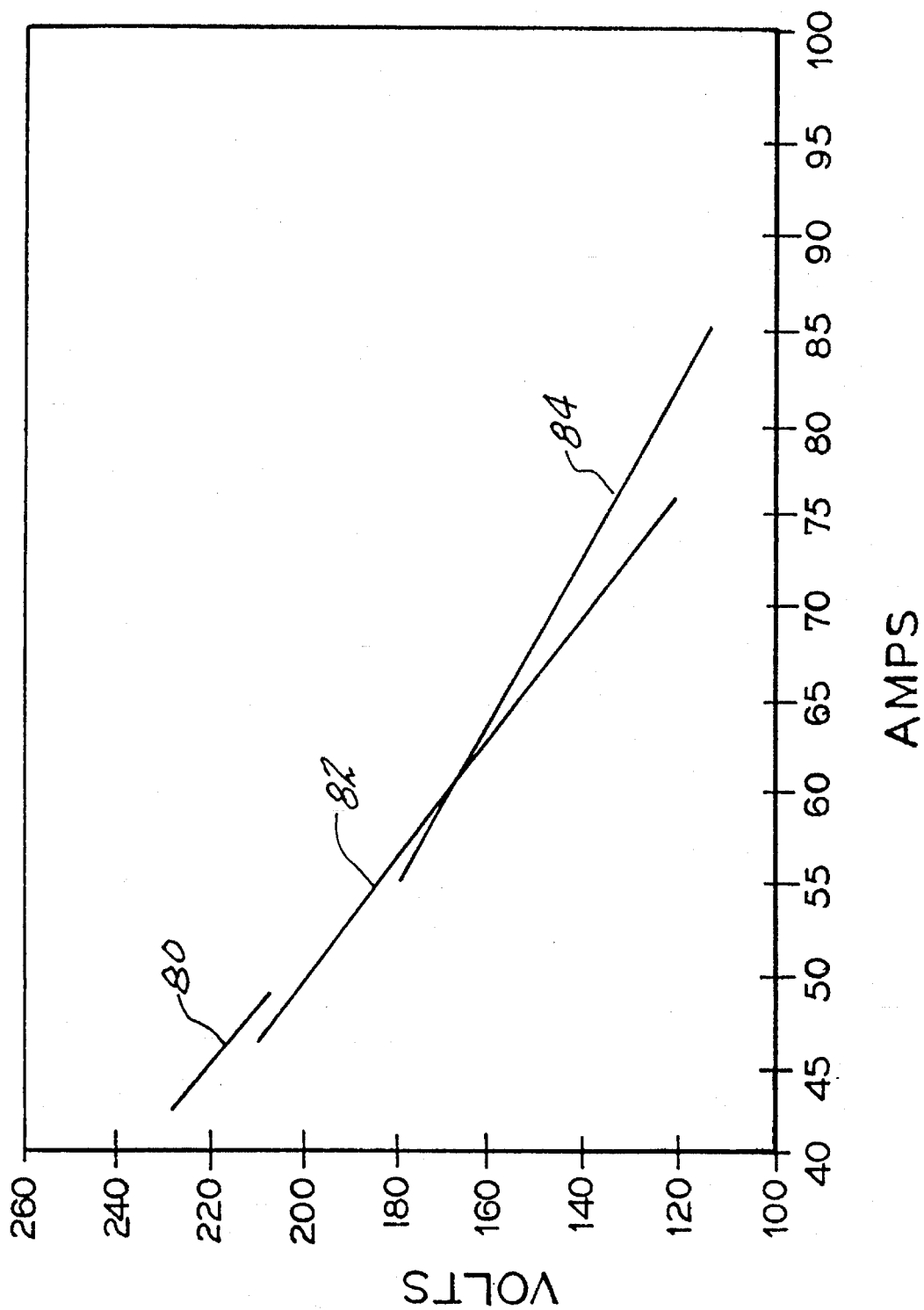
FIG. 8 graphically illustrates the operating voltage of the anode nozzle.

With reference to FIG. 8, the voltage to sustain the arc is higher for the nozzle of the invention as denoted by reference line 80 than for a conventional biangle nozzle without a regeneration passageway as denoted by reference line 82 or for a single angle nozzle as denoted by reference line 84. Running at a higher voltage, such as from about 200 volts to about 250 volts and preferably from about 210 volts to about 230 volts, with a correspondingly lower current, reduces cathode and anode erosion, thereby increasing the effective thruster life.

It is apparent that there has been provided in accordance with this invention a process for the manufacture of an electrothermal arcjet thruster that fully satisfies the objects, features and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. An anode for an electrothermal arcjet thruster, comprising:

an electrically conductive body internally containing a regeneration channel;

a converging upstream portion forming one wall of said electrically conductive body, said wall having both a regeneration inlet and a regeneration outlet in communication with said regeneration channel;

a constricted portion forming a centrally disposed wall of said electrically conductive body and defining a cylindrical aperture, a first end of said constricted portion adjacent said converging upstream portion; and a diverging nozzle portion forming a downstream wall of said electrically conductive body adjacent an opposing second end of said constricted portion, said diverging nozzle portion having in tandem a divergent recombination portion and a divergent expansion portion wherein said divergent expansion portion has a greater rate of divergence than said recombination portion.

2. The anode of claim 1 wherein said regeneration channel is adjacent said divergent recombination portion.

3. The anode of claim 2 wherein said regeneration channel is from about 1.25 mm to 5.1 mm from said divergent recombination portion.

4. The anode of claim 2 wherein said regeneration inlet and said regeneration outlet are configured such that a propellent gas flows into said regeneration inlet, which is adjacent to said recombination portion and said propellant gas flows from said regeneration outlet, which is spaced from said recombination portion.

5. The anode of claim 4 wherein said propellent absorbs and retains at least about 65% of the heat flowing through said anode.

6. The anode of claim 5 wherein said propellent absorbs and retains from about 80% to 97% of the heat flowing into said anode.

7. The anode of claim 5 wherein an angle, $\alpha$, formed by said recombination portion and said constricted portion is from about 1° to 10° and an angle, $\beta$, between said expansion portion and said constricted portion is from about 10° to 40°.

8. The anode of claim 7 wherein the angle, $\alpha$, formed by said recombination portion and said constricted portion is from about 3° to 7° and the angle, $\beta$, between said expansion portion and said constricted portion is from about 15° to 30°.

9. An electrothermal arcjet thruster, comprising:

an electrically conductive anode body containing a regeneration channel extending within said electrically conductive body, said anode body having a converging upstream wall portion with both a regeneration inlet and a regeneration outlet in communication with said regeneration channel, a constricted portion having a first end adjacent said converging upstream wall portion, said constricted portion defining a cylindrical aperture, and a diverging nozzle portion forming a downstream wall of said electrically conductive body adjacent an opposing second end of said constricted portion, said diverging nozzle portion having in tandem a divergent recombination portion and a divergent expansion portion wherein said divergent expansion portion has a greater rate of divergence than said recombination portion;

a cathode disposed within said converging upstream portion with one end adjacent said constricted portion;

a gaseous propellent flowing from said converging portion to said diverging portion, a portion of said propellent flowing through said regeneration channel; and a power supply generating a voltage differential between said anode and said cathode.

10. The arcjet thruster of claim 9 wherein said regeneration channel is adjacent said divergent recombination portion.

11. The arcjet thruster of claim 10 wherein said propellent is a liquid storable fuel.

12. The arcjet thruster of claim 11 wherein said propellent is hydrazine.

13. The arcjet thruster of claim 12 wherein said regeneration inlet and said regeneration outlet are configured such that a propellent gas flows firstly through a portion of said regeneration channel adjacent to said recombination portion and then flows through a portion of said regeneration channel spaced from said recombination portion.

14. The anode of claim 13 wherein said propellent absorbs at least about 65% of the heat flowing through said anode.

15. The anode of claim 14 wherein said propellent absorbs from about 80% to 97% of the heat flowing through said anode.

16. The anode of claim 15 wherein an angle, $\alpha$, formed by said recombination portion and said constricted portion is from about 1° to 10° and an angle, $\beta$, between said expansion portion and said constricted portion is from about 10° to 40°.

17. The anode of claim 16 wherein the angle, $\alpha$, formed by said recombination portion and said constricted portion is from about 3° to 7° and the angle, $\beta$, between said expansion portion and said constricted portion is from about 15° to 30°.

* * * * *